United States Patent [19]

Scherer

[11] Patent Number: 4,663,974
[45] Date of Patent: May 12, 1987

[54] PRESSURE SENSING DEVICE

[75] Inventor: Otto Scherer, Obererlinsbach, Switzerland

[73] Assignee: Huba Control AG, Würenlos, Switzerland

[21] Appl. No.: 786,333

[22] Filed: Oct. 10, 1985

[30] Foreign Application Priority Data

Oct. 15, 1984 [CH] Switzerland ............ 4930/84

[51] Int. Cl.⁴ .................. G01L 7/08; G01L 7/10
[52] U.S. Cl. .................................. 73/728; 73/708
[58] Field of Search ............ 73/728, 722, 708, 753, 73/386, 387; 336/30

[56] References Cited

U.S. PATENT DOCUMENTS 2,980,835  4/1961  Williams ............................. 73/722
3,153,210  10/1964  Kinderman ......................... 336/30
4,242,914  1/1981  Eshelman et al. ..................... 73/728

Primary Examiner—Donald O. Woodiel
Attorney, Agent, or Firm—Werner W. Kleeman

[57] ABSTRACT

A diaphragm arranged between two pressure chambers is coupled through a diaphragm plate to a leaf spring. The leaf spring is fixed at one end and is provided with an actuating boss. A free end of the leaf spring serves as an armature which cooperates with a measurement transducer operating on the contactless principle. The measurement transducer delivers a constant electrical output signal as the input signal of a constant regulator or, alternatively, for switching a two-threshold regulator. Due to the low mass of such a leaf spring, the sensor incorporating the transducer is largely independent of orientation and insensitive to mechanical shock.

7 Claims, 5 Drawing Figures

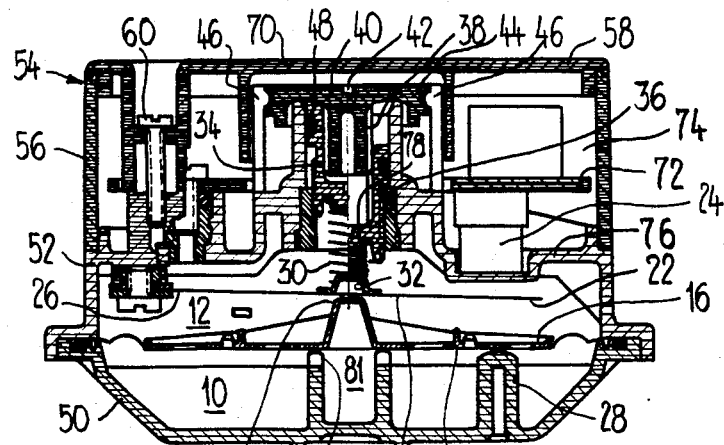
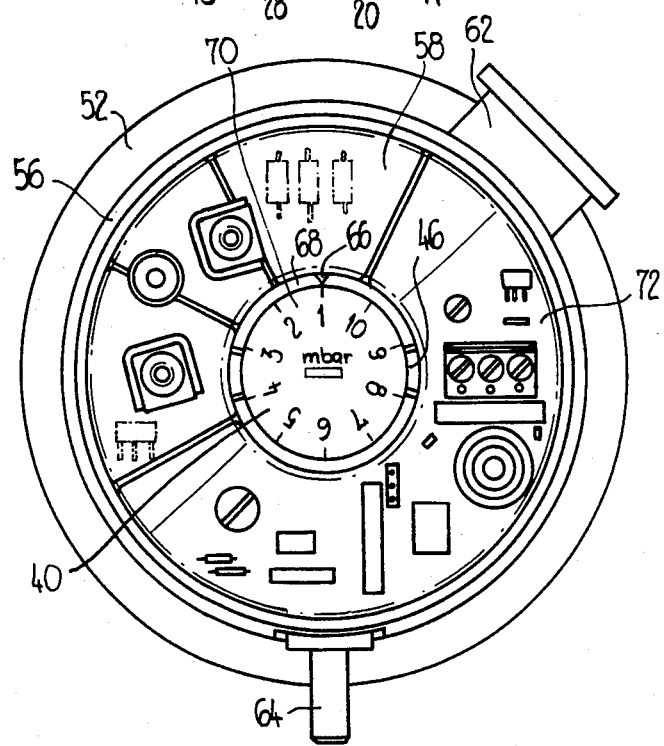
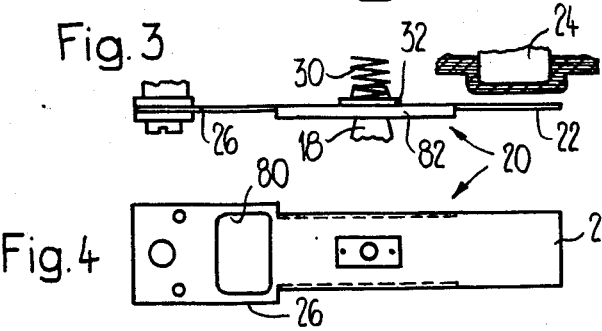
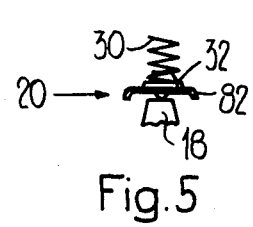

PRESSURE SENSING DEVICE

BACKGROUND OF THE INVENTION

The present invention broadly relates to pressure measurements and, more specifically, pertains to a new and improved construction of a pressure sensing device.

Generally speaking, the pressure sensing device of the present invention comprises a sensor for delivering an electrical output signal in response to a pressure and such contains a first chamber, a second chamber and a wall member separating the first chamber from the second chamber. The wall member is arranged to deflect under the influence of pressure in the first chamber. A leaf spring is arranged in the second chamber and has a fixed end and a free end. The leaf spring is fixedly mounted in the second chamber at the fixed end. The wall member has a middle region and is mechanically coupled at the middle region to the leaf spring. The free end of the leaf spring cooperates with a measurement transducer serving as a contactless transmission element.

A sensor or sensing device of this type serves for converting or transforming the physical phenomenon or variable of pressure into an electrical value. The output value of the sensor or sensing device is dependent upon pressure and can serve to control an electrical contact or can form an input value for a control or regulating device. Such a sensor or sensing device can, for instance, be employed in two-threshold or window-type regulation or for constant regulation. The sensor or sensing device can also serve as a simple signal transducer or generator.

A sensing device of this type is known from the U.S. Pat. No. 2,950,421, granted Aug. 23, 1960. One chamber of this known sensing device is under vacuum while the other chamber is formed as a pressure-sensitive diaphragm chamber within the vacuum chamber. The diaphragm chamber can be subjected to the pressure to be measured. A deflectable wall of the diaphragm chamber is connected to a leaf spring arranged in the vacuum chamber. The leaf spring forms the movable contact of a double-throw switch. Cable seals are required for conducting the connections of this switch out of the vacuum chamber. The movable contact of the switch forms a condensor or capacitor in relation to one of the fixed contacts. The air gap of this capacitor is variable due to the motion of the movable contact. The cable seals are a disadvantageous feature of this known sensing device, since they can cause leakage leading to a diminution or loss of the vacuum. This known sensing device is furthermore only suitable for measuring a pressure and not for measuring a differential pressure.

A measurement transducer for converting or transforming a pressure into an electrical value and having a contactless transmission element is known from the French Pat. No. 1,187,259, granted Mar. 2, 1959. This measurement transducer comprises an aperture or aperture-screen which modulates a light beam and serves as a contactless transmission element. The contactless transmission element is coupled by a plunger to a diaphragm exposed to the pressure to be measured. The plunger in this measurement transducer is conducted out through an opening to the transmission element, so that this chamber is connected with the ambient atmosphere through the opening. This known measurement transducer is therefore not suited for measuring a difference in pressure.

A pressure measuring apparatus comprising a measurement transducer with inductive sensing is known from the U.S. Pat. No. 2,260,837, granted Oct. 28, 1941. The transmission element of this measurement transducer is arranged between two coils. A U-shaped core is associated with each of the two coils. Transmission of the pressure to be measured from an accordion bellows to the transmission element is effected by means of a massive plunger which is centered by a diaphragm. To the extent that the pressure to be measured is taken up by the accordion bellows in this known sensor, the diaphragm serving to center the plunger causes supplementary frictional resistance which detrimentally affects the measurement accuracy in relation to fine pressure differences.

An apparatus for controlling the pressure of a fluid delivered by a pump is known from the British Published Patent Application No. 2,089,497, published June 23, 1982. A membrane-controlled transmission element in the form of a leaf spring supports a flag at its end for interrupting a light beam when the pressure of the fluid increases. The transmission element is located outside the pressure chamber in this known arrangement, as it is in the two previously mentioned patents, French Pat. No. 1,187,259 and U.S. Pat. No. 2,260,837.

A barometric pressure measurement diaphragm chamber is disclosed in the U.S. Pat. No. 3,451,272, granted June 24, 1969. The diaphragm chamber is arranged within a U-shaped curved spring. This device serves as a barometer for measuring the atmospheric air pressure and does not comprise any measurement transducer having a contactless transmission element.

SUMMARY OF THE INVENTION

Therefore, with the foregoing in mind, it is a primary object of the present invention to provide a new and improved construction of a pressure sensing device which does not exhibit the aforementioned drawbacks and shortcomings of the prior art constructions.

Another and more specific object of the present invention aims at providing a new and improved construction of a pressure sensing device of the previously mentioned type which is suitable for use as a differential pressure sensor or sensing device and in which no electrical components come into contact with the pressure medium to be measured, while a practically hysteresis-free conversion or transformation of the measurement result is nevertheless ensured.

Yet a further significant object of the present invention aims at providing a new and improved construction of a pressure sensing device of the character described which is relatively simple in construction and design, extremely economical to manufacture, highly reliable in operation, not readily subject to breakdown or malfunction and requires a minimum of maintenance and servicing.

Now, in order to implement these and still further objects of the invention, which will become more readily apparent as the description proceeds, the pressure sensing device of the present invention is manifested by the features that it comprises a third chamber, the third chamber comprising wall elements delimiting the third chamber and the measurement transducer being arranged outside the first and second chambers. The wall elements delimiting the third chamber may be made of an electrically insulative material or a non-magnetic metallic material. In a preferred embodiment of the invention, no seals or sealing guides are necessary for electrical conductors or for mechanical transmission elements for transmitting the measurement result to the region outside the pressure chamber in spite of the arrangement of two pressure chambers suitable for measuring a differential pressure. The omission of seals or sealing guides eliminates any sealing problems. Furthermore, no electrical components come into contact with the pressure medium to be measured which, according to the specific application, may be an aggressive gas or an aggressive liquid. The omission of mechanical guides in the form of plungers not only eliminates sealing problems but also any supplementary frictional resistance inevitably associated with guide means.

According to a further preferred embodiment of the invention, not only can a gauge pressure, i.e. a pressure relative to the atmosphere, be measured, but also pressure difference, for instance a pressure difference between two different measurement points within a pressure system.

BRIEF DESCRIPTION OF THE DRAWINGS

The invention will be better understood and objects other than those set forth above will become apparent when consideration is given to the following detailed description thereof. Such description makes reference to the annexed drawings wherein throughput the various figures of the drawings there have been generally used the same reference characters to denote the same or analogus components and wherein:

FIG. 1 schematically shows a pressure sensing device in longitudinal section;

FIG. 2 schematically shows the pressure sensing device of FIG. 1 in plan view;

FIG. 3 schematically shows a leaf spring forming the armature of a measurement transducer in side view;

FIG. 4 schematically shows the leaf spring in plan view; and

FIG. 5 schematically shows the leaf spring in transverse section.

DETAILED DESCRIPTION OF THE PREFERRED EMBODIMENTS

Describing now the drawings, it is to be understood that to simplify the showing thereof only enough of the structure of the pressure sensing device has been illustrated therein as is needed to enable one skilled in the art to readily understand the underlying principles and concepts of this invention. Turning now specifically to FIG. 1 of the drawings, the pressure sensing apparatus illustrated therein by way of example and not limitation will be seen to comprise a lower, first pressure chamber 10 for a higher pressure and an upper, second pressure chamber 12 for a lower pressure. The first and second pressure chambers 10 and 12 are separated from one another by a diaphragm or membrane 14. forming a wall member between the first and second pressure chambers 10 and 12 Both first and second pressure chambers 10 and 12 comprise a pressure connector means 64 not particularly visible in FIG. 1 but illustrated in FIG. 2. As far as only a gauge pressure, i.e. an excess pressure in relation to the atmosphere, is to be measured, only the lower pressure chamber 10 is connected to the pressure medium to be measured, while the upper pressure chamber 12 is connected with the atmosphere. Both the first and second pressure chambers 10 and 12 are connected to or flow communicate with respectively associated pressure media when a differential pressure between two pressure circuits is to be measured. In such a case the pressure circuit having the higher pressure must be connected to the lower pressure chamber 10, since the diaphragm 14 can only be moved in the direction of the upper pressure chamber 12.

A diaphragm plate 16 rests upon the diaphragm 14. The diaphragm plate 16 comprises an actuating boss 18 at its center. The actuating boss 18 bears on the middle region of a leaf spring 20 as best seen in FIG. 1. The free end of the leaf spring 20 serves as an armature 22 of a contactlessly operating measurement transducer 24. An other end 26 of the leaf spring 20 is fixedly mounted in the not particularly referenced housing of the pressure sensing device. A plurality of rests or stop members 28 and 28' are arranged in the lower pressure chamber 10, i.e. the chamber of higher pressure, for limiting any downward motion of the diaphragm 14.

The diaphragm 14 moves in the direction of the upper pressure chamber 12, i.e. the chamber of lower pressure, against the action of a pre-loaded compression spring 30 when subjected to pressure from the pressure chamber 10, i.e. the chamber of higher pressure. The compression spring 30 is arranged coaxially with the actuating boss 18 of the diaphragm 14 and is supported by centering means 32 mounted or formed on the leaf spring 20. The compression spring 30 is supported within an adjustment or adjusting screw 34 at its other end. The pre-loading of the compression spring 30 and therefore the working range of the pressure sensing device or, alternatively, the threshold or switching point of a two-threshold regulator, can be adjusted by means of the adjusting screw 34.

The adjusting screw 34 is shown adjusted to a light pre-loading of the compression spring 30 on the left of FIG. 1 and to a heavy pre-loading of the compression spring 30 on the right on FIG. 1. The adjusting screw 34 comprises a steep, sextuple-pitch, external thread by means of which the adjusting screw 34 is threaded into a threaded bushing 36. A stroke or adjusting motion of the adjusting screw 34 can be achieved by such a steep thread in about a single rotation and which, for instance, corresponds to the different positions of the adjusting screw 34 represented left and right of the centerline in FIG. 1.

The adjustment screw 34 is connected with a coaxially arranged graduated disc or dial 40 by a splined shaft or sleeve connection 38. The graduated disc or dial 40 comprises a screwdriver slot 42 for adjustment purposes. In order that the dial 40 always remain substantially in a predetermined plane independent of the position of the adjusting screw 34, the dial 40 is provided with an annular groove 44 at its circumference in which resilient elements 46 engage to form a snap retainer.

An O-ring seal 48 is recessed in the outer surface of the adjustment screw 34. This O-ring seal 48 serves, on the one hand, for sealing the adjacent upper chamber 12 and, on the other hand, as a rotational inhibitor or brake for the adjustment screw 34. Due to this arrangement of the O-ring seal 48, no supplementary retention or sealing of the adjustment screw 34, such as used to be commonly performed using lacquer, is required. If no adjustment possibility of the pressure sensing device in service is required, the dial 40 can be omitted and replaced by a not particularly shown cover insertable into the resilient elements 46 forming the snap retainer. Adjustment possibilities during service can be foregone when the transducer 24 sends a constant output signal to a regulator. The reference value of such a constant output signal may be adjustable by electrical circuit components.

In the illustrated embodiment of the invention, the measurement transducer 24 preferably comprises an inductively operating measurement transducer with which the armature 22 is associated as the transmission element. When pressure is applied, the armature 22 will assume in relation to the measurement transducer 24 a certain position dependent upon the applied pressure and the pre-loading of the compression spring 30. The measurement transducer 24, for its part, delivers an electrical signal dependent upon the position of the armature 22 as an input signal for an electronic regulator or for controlling switch contacts. It is, however, also possible to employ a capacitative measurement transducer or an optical measurement transducer instead of an inductive measurement transducer. In an optical measurement transducer, a screen or shutter is employed as the transmission element instead of the armature 22.

The lower and upper pressure chambers 10 and 12 are essentially delimited by lower and upper pressure chamber housing components 50 and 52. An upper housing part 54 rests on the upper pressure chamber housing component 52. The upper housing part 54 surrounds the electrical or electronic circuit components and the adjustment element comprising the adjustment screw 34. The upper housing part 54 comprises a hollow cylindrical wall member 56 and a cover 58. The cover 58 is screwed to the upper pressure chamber housing component 52 by two screws, only one screw 60 of which is shown in FIG. 1. The hollow cylindrical wall member 56 is rotatable between the upper pressure chamber housing component 52 and the cover 58 after loosening the screw 60.

It can be seen from FIG. 2 that a cable seal or lead-out 62 is radially arranged in the hollow cylindrical wall member 56. Due to the rotatability of the hollow cylindrical wall member 56, the cable seal 62 can be adjusted into any desired radial direction. The previously mentioned pressure connector means can also be seen in FIG. 2, namely the pressure connector means 64 of the upper pressure chamber 12. The pressure connector means of the lower pressure chamber 10 extends in the same direction as the pressure connector means 64 and is therefore concealed by the pressure connector means 64 in the view of FIG. 2.

The graduated disc or dial 40 is provided with scale graduations from one to ten in the manner of a dial or clock face and, in the illustrated embodiment, is calibrated in millibar. An adjustment or reference mark 66 is situated opposite the scale graduations and is mounted on a hollow cylindrical guide means 68 for the dial 40. The superposed cover 58 of the upper housing part 54 comprises a transparent region 70 at least in a surface region corresponding to the dial 40. The remaining portion of the cover 58 can also be transparent or frosted or even opaque. Other transparent regions can also be provided in the cover 58 for, for instance, making visible signal lights or a digital pressure display.

A ring-shaped or annular circuit board 72 is arranged within the upper housing part 54. The circuit board 72 coaxially surrounds the adjustment element comprising the adjusting screw 34 and carries the circuit components of an evaluation circuit and of the measurement transducer 24.

The upper housing part 54 peripherally delimits in an upward direction a chamber or space 74 containing the circuit components of the evaluation circuit and of the measurement transducer 24 and the adjustment element comprising the adjusting screw 34. The space 74 is delimited in relation to the upper pressure chamber 12 by a wall member 76.

A cap 78 is arranged between the compression spring 30 and the adjusting screw 34 as a compression spring bearing or support member. This cap 78 prevents the compression spring 30 from being inadvertently rotated when adjusting the adjusting screw 34. When considering the already described individual components of the pressure sensing device, it should be apparent that when rotating the dial 40 only the adjusting screw 34 is moved in an axial direction due to the interposed splined sleeve connection 38. Such an arrangement permits limiting the construction height of the housing to a minimum. The splined shaft connection 38 is constructed such that it serves not only to provide the entrainment function for the adjusting screw 34 but also to initially adjust the graduated scale of the dial 40 to the effective pressure value when installing the pressure sensing device. The resilient elements 46 forming the snap retainer permit a ready removal of the dial 40 by head without requiring special tools.

Although the diaphragm 14 rests upon the rests or stop members 28 and 28' in the illustrated embodiment, a not particularly shown embodiment having a floating zero position is also possible. In such an embodiment the dead weight of the diaphragm 14 is compensated by a counter-spring with a counter-support plate. Such a counter-spring can, for instance, be arranged beneath the diaphragm 14 in an interior space 81. Such an embodiment is necessary for employing the pressure sensing device to generate a constant output signal when the pressure sensing device is installed with the compression spring 30 acting in an upward direction.

In order to compensate the influence of ambient temperature, the compression spring 30 can be arranged in series with at least one bimetallic element.

Although the end of the leaf spring 20 serving as the armature 22 constitutes the transmission element in the illustrated embodiment, it is also possible to employ, for instance, a ferrite core coupled with the diaphragm 14 and arranged within a coil of the measurement transducer 24. The electrical or electronic circuit arrangement suitable for the envisioned applications is known per se.

In special applications, a person skilled in the art may also decide that a piston is to be employed as a movable wall member instead of the diaphragm 14 shown in the illustrated embodiment.

FIGS. 3, 4 and 5 show a preferred embodiment for the leaf spring 20 only schematically shown in FIG. 1. It can be seen from FIGS. 3 and 5 that the leaf spring 20 is reinforced or stiffened in its middle region by a channel-shaped or U-shaped profile or channel 82. It can be seen from FIG. 4 that the leaf spring 20 is provided with an aperture 80 in the region of its anchoring or mounting point 26 for diminishing the spring constant. A leaf spring 20 of particularly low mass can be fabricated for the foreseen application by such weakening of the leaf spring 20 in the region of its mounting point 26 and by such reinforcement in its middle region in the form of a channel.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A pressure sensing device for delivering an electrical output signal in response to a pressure to be measured, comprising:

a first chamber;

a second chamber;

a wall member separating said first chamber from said second chamber;

a leaf spring arranged in said second chamber and having a fixed end, a middle region and a free end;

a measurement transducer;

said wall member being arranged to deflect under the influence of the pressure to be measured acting in said first chamber;

said lead spring being fixedly mounted at said fixed end in said second chamber;

said wall member having a middle region;

said wall member being mechanically coupled at said middle region to said middle region of said leaf spring;

said free end of said leaf spring cooperating with said measurement transducer as a contactless transmission element;

a third chamber;

said third chamber comprising wall elements delimiting said third chamber; and said measurement transducer being arranged outside said first chamber and outside said second chamber and inside said third chamber.

2. The pressure sensing device as defined in claim 1, wherein:

said wall elements are formed of electrically insulative material.

3. The pressure sensing device as defined in claim 1, wherein:

said wall elements are formed of a non-magnetic metallic material.

4. The pressure sensing device as defined in claim 1, wherein:

said first chamber and said second chamber each possess pressure connector means for measuring a differential pressure.

5. A pressure sensing device for delivering an electrical output signal in response to a pressure to be measured, comprising:

a first chamber;

a second chamber;

a wall member separating said first chamber from said second chamber;

a leaf spring arranged in said second chamber and having a fixed end and a free end;

a measurement transducer;

said wall member being arranged to deflect under the influence of the pressure to be measured acting in said first chamber;

said wall member having a middle region;

said wall member being mechanically coupled at said middle region to said leaf spring;

said free end of said leaf spring cooperating with said measurement transducer as a contactless transmission element;

a third chamber;

said third chamber comprising wall elements delimiting said third chamber;

said measurement transducer being arranged outside said first chamber and outside said second chamber;

said leaf spring having a middle region;

said leaf spring having a low mass; and said leaf spring being stiffened in said middle region by a channel-shaped profile.

6. A pressure sensing device for delivering an electrical output signal in response to a pressure to be measured, comprising;

a first chamber;

a second chamber;

a wall member separating said first chamber from said second chamber;

a leaf spring arranged in said second chamber and having a fixed end and a free end;

a measurement transducer;

said wall member being arranged to deflect under the influence of the pressure to be measured acting in said first chamber;

said wall member having a middle region;

said wall member being mechanically coupled at said middle region to said leaf spring;

said free end of said leaf spring cooperating with said measurement transducer as a contactless transmission element;

a third chamber;

said third chamber comprising wall elements delimiting said third chamber;

said measurement transducer being arranged outside said first chamber and outside said second chamber;

said leaf spring having a mounting region defined by said fixed end;

said leaf spring having a characteristic spring constant; and said leaf spring being weakened by an aperture provided near said mounting region for diminishing said spring constant.

7. The pressure sensing device as defined in claim 1, wherein:

said measurement transducer comprises an inductive transducer; and said transmission element defining an armature of said inductive transducer.

* * * * *